Oct. 7, 1941.    H. W. RUBINSTEIN    2,257,979
COMBINED SHAFT BEARING AND COUPLING
Filed Dec. 23, 1939    2 Sheets-Sheet 1
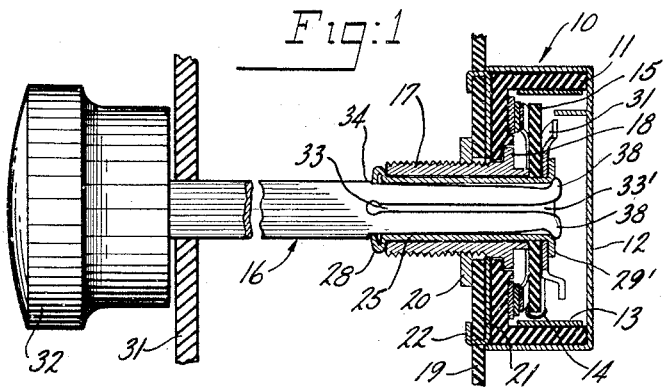
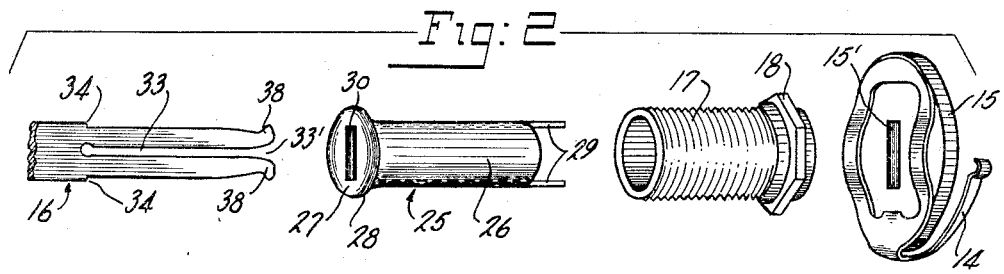
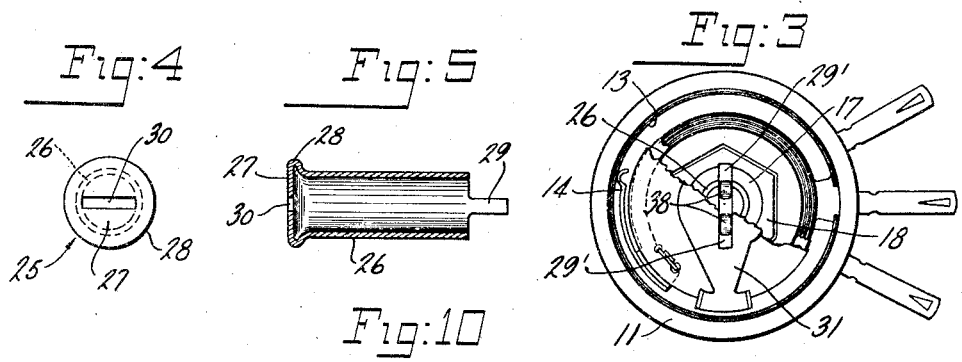
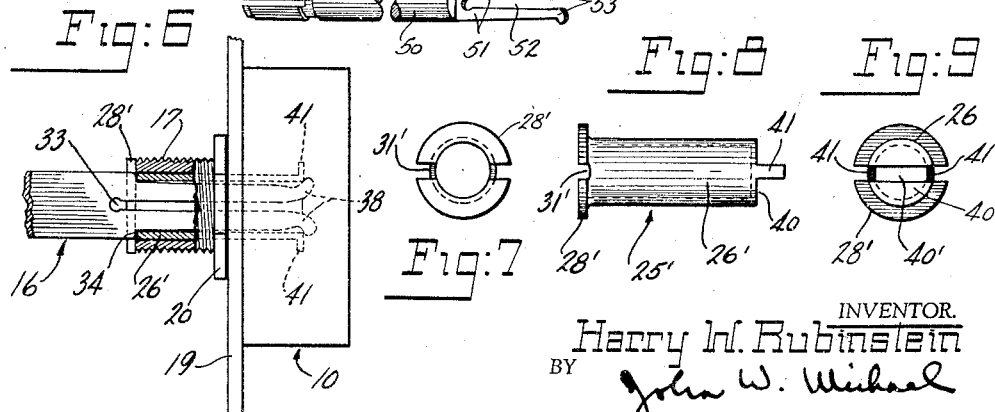
INVENTOR.
Harry W. Rubinstein
BY John W. Michael
ATTORNEY.

Oct. 7, 1941.  H. W. RUBINSTEIN  2,257,979
COMBINED SHAFT BEARING AND COUPLING
Filed Dec. 23, 1939  2 Sheets-Sheet 2
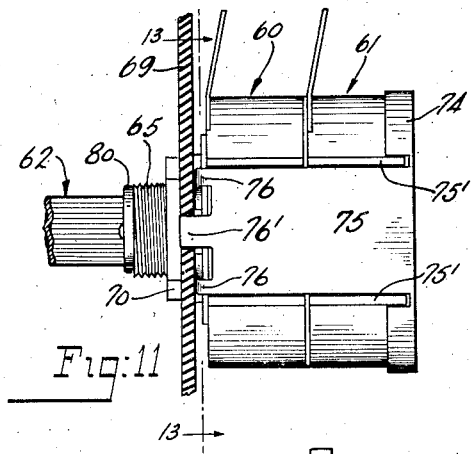
Fig:11
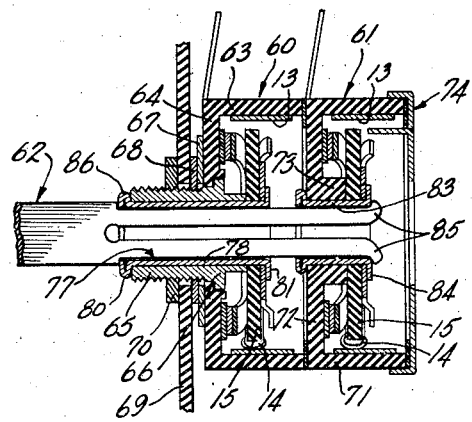
Fig:12
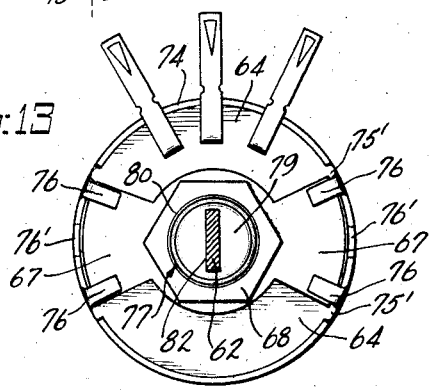
Fig:13
Fig:14
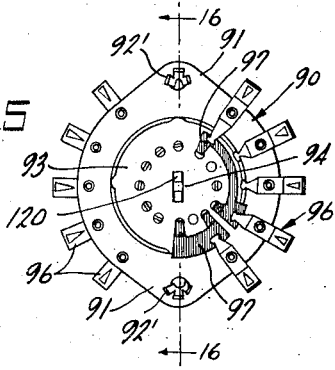
Fig:15
Fig:16
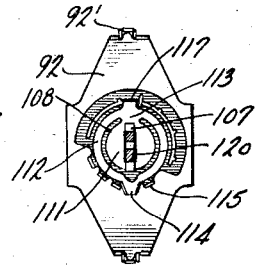
Fig:17
Fig:10a
INVENTOR.
Harry H. Rubinstein
BY John W. Michael
ATTORNEY.

Patented Oct. 7, 1941

2,257,979

UNITED STATES PATENT OFFICE 2,257,979

COMBINED SHAFT BEARING AND COUPLING

Harry W. Rubinstein, Milwaukee, Wis., assignor to Globe-Union Inc., Milwaukee, Wis., a corporation of Delaware Application December 23, 1939, Serial No. 310,866

9 Claims. (Cl. 64—4)

This invention relates to a combined shaft coupling and bearing, which is especially adapted for use in mountings and connecting control shafts to electrical control devices, such as volume controls, tone controls, switches, or similar control devices employed on a radio receiver.

One of the objects of the present invention is to provide a combined shaft coupling and bearing of this character, which makes it practical to readily and easily couple the shaft to or uncouple it from its control device, and yet when coupled the shaft is firmly supported for rotation, securely held against accidental displacement, and effectively rotatively coupled to the movable element of the control device.

Another object of the invention is to provide a combined coupling and bearing of this character, which is simple, compact and closely organized in construction, reliable and efficient in operation, easily manipulated, and easy and comparatively inexpensive to manufacture.

Another object of the invention is to provide a device of this character, which may, if desired, be conventionally manufactured of sheet metal stampings.

A further object of the invention is to provide a device of this character, which may be conveniently combined with multiple unit in such a way as to simplify and compact the construction thereof.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 1 is a view partly in side elevation and partly in central, vertical, longitudinal section, showing a combined shaft coupling and bearing embodying the present invention and employed to mount the control shaft of a volume control device and rotatively couple it to the movable element or movable contact of the volume control device.

Figure 2 is a group view in perspective showing a portion of the shaft, its rotatable bearing bushing, its fixed bearing sleeve, and the movable contact for the volume control device.

Figure 3 is a view in end elevation of the volume control device with which the present invention is combined, the metal cover of the volume control being removed and portions of certain of the elements of the volume control being broken away for the purpose of illustration.

Figure 4 is a detail view in end elevation of the rotatable bearing bushing or cartridge.

Figure 5 is a view thereof in central, vertical, longitudinal cross section.

Figure 6 is a fragmentary view partly in side elevation and partly in central vertical longitudinal section, showing a slightly modified construction.

Figure 7 is a view in end elevation of the rotatable bearing bushing employed in the form of the device illustrated in Figure 6.

Figure 8 is a view in side elevation of the bearing bushing shown in Figure 7.

Figure 9 is a view in end elevation of the opposite end of the bearing bushing from that shown in Figure 7.

Figure 10 is a detail view in elevation of a modified form of control shaft.

Figure 10a is a fragmentary view of an elevation showing a still further modification in the structure of the control shaft.

Figure 11 is a fragmentary view partly in side elevation and partly in vertical cross section, showing the invention as embodied in a multiple unit control.

Figure 12 is a view partly in side elevation and partly in central, vertical, longitudinal section, further illustrating the construction shown in Figure 11.

Figure 13 is a view in transverse, vertical cross section taken on line 13—13 of Figure 11.

Figure 14 is a detail view in end elevation of a rotatable bearing bushing or cartridge, which may be employed in any of the various structures embodying the present invention, and which has the side walls of its slot serrated or roughened to enhance the frictional engagement between the walls of the slot and the control shaft.

Figure 15 is a view in end elevation of a step-by-step switch equipped with a control shaft coupling and mounting embodying the present invention.

Figure 16 is a view in transverse, vertical cross section taken on line 16—16 of Figure 15, with parts shown in elevation for the sake of simplicity and illustration; and Figure 17 is a view in transverse, vertical cross section taken on line 17—17 of Figure 16.

Referring to the drawings, and more particularly to Figures 1 to 10, inclusive, it will be seen that the invention is there shown, for the purposes of illustration only, as being embodied in a volume control device, designated generally at 10. While the specific construction of the volume control per se forms no part of the present invention, it will be seen that generally speaking it is of the type having a casing or housing 11 of insulating material which has one end opened and equipped with a metal cover 12. The cover 12 is suitably attached and releasably secured to the casing. Applied to the inner peripheral wall of the casing 11 is a resistance element 13 in the form of a carbonaceous or conductive coated strip of paper, or some other similarly coated flexible material. The movable contact 14 of the volume control is adjustable around the conductive strip. The movable contact 14 is carried by an insulating disk 15, which is rotatively coupled to the control shaft 16 in a manner which will more clearly appear. The end of the casing 11 opposite the metal cover 12 is provided with some suitable type of fixed bearing, here shown as an externally threaded, fixed sleeve 17, which has its inner end flanged, as at 18, and engaged with a suitable seat provided therefor in the centrally apertured end wall of the casing. In use the fixed bearing sleeve 17 projects through an opening provided in the supporting member 19. A nut 20 is threaded on the bushing and engages the support 19. In some instances the support of the volume control may be supplemented by means of a mounting plate 21, suitably combined with its closed end and having attaching tabs 22 which are extended through openings in the support. It is to be understood, however, that the particular construction of the bushing, or the specific way the volume control or the like is supported, may be widely varied.

A cartridge or rotatable bearing bushing 25 is fitted in the fixed bearing sleeve 17 for rotative movement. This rotatable bearing bushing 25 has a cylindrical body portion 26 provided at one end with an integral end wall 27 united to the body portion of the cartridge by means of a crimp or flange 28. The cylindrical body portion 26 is provided at its inner end, and at diametrically opposite portions, with integral anchoring lugs 29. A diametrical slot 30 is formed in the end wall 27 of the bearing bushing. The bearing bushing 25 is assembled with the fixed bearing sleeve 17 in the manner illustrated in Figure 1, so that its cylindrical body portion 26 is a rotating fit in the fixed bearing sleeve 17, and its flange 28 rotatively abuts the outer end of the fixed sleeve 17. The tabs 29 at the inner end of the body portion of the rotatable bearing sleeve are extended through a rectangular slot 15' provided in the insulating disk of the movable contact, and also extended through a similar slot provided in the hub portion of a combination rotatable stop member and switch operator, designated as at 31, and their extremities are then bent or clinched over, as at 29' (see Figure 3). In this way the parts are maintained assembled and a rotative coupling is had between the rotatable bearing sleeve or cartridge and the movable element 15 of the body control.

As illustrated, the shaft 16 is preferably constituted of flat stock, and may be stamped from a flat strip of stiffly resilient metal of suitable gauge, and then cut into sections of appropriate length. The outer end of the shaft 16 passes through an opening provided therefor in the front panel 31 of the radio receiver, and at its extreme outer end is equipped with a knob 32. The inner end portion of the shaft is provided with a longitudinal slot 33, which extends for a considerable portion of the length of the shaft and out through the inner end thereof. The portion of the shaft in which the slot 33 is formed is of reduced width so that shoulders 34 are presented at the juncture of the reduced portion and main portion of the shaft. Near the end of the shaft through which the slot 33 extends the slot is widened out or flared, as indicated at 33', and the sections of the shaft on the opposite sides of the flared portion of the slot are formed into outwardly directed double beveled hooks 38. The shaft 16 is so dimensioned and proportioned that when its inner end is inserted through the slot 30 the outer edges of its reduced portion bear against the inner peripheral wall of the bushing 25 and in the assembly the shoulders 34 abut the portions of the flange 28 disposed in alinement with the ends of the slot 30. Furthermore, their hooks 38 on the inner end of the shaft snap over the angularly bent end portions 29' of the tabs 29 to positively and releasably interlock the shaft with the rotatable bearing sleeve or cartridge.

This construction not only supports the shaft 16 for rotation, but effectively though releasably couples it to the rotating bearing bushing or cartridge 25, and also establishes a driving connection or rotative coupling between the shaft 16 and the movable elements 14, 15 of the volume control device 10. The knob 32 and shaft 16 may be readily detached by simply pulling outwardly on the knob 32 since the double bevel of the hooks 38 permits the sections of the shaft to spring together as well as to spring apart. In other words, the hooks 38, when subjected to a pull or push, are cammed inwardly first, and then, of course, when they pass the ends of the bearing sleeve or cartridge 25, they spring outwardly under the influence of the inherent resiliency of the split or slotted portion of the shaft.

In the form of the invention shown in Figures 6 to 9, all of the elements heretofore described are employed, and the foregoing description applies, save that the construction of the rotating bearing bushing, designated at 25', is slightly varied. The bearing sleeve has a cylindrical body portion 26' as before, but the inner end of this body portion is closed by an integral end wall 40, and the tabs corresponding to the tabs 29, and herein designated at 41, are struck out of the inner end wall 40 forming a transverse slot 40'. The outer end of the cylindrical body portion 26' is open, but is provided with an outwardly directed flange, designated at 28', which has diametrically opposite slots 31'. In this form of the invention the shoulders 34 abut the floors of the slots 31' and are interlocked with the side walls thereof, and the shaft 16 is further interlocked with the slot 40' in the inner end wall 40 of the rotatable bearing bushing 25. The tabs 41 are clinched over the movable elements of the volume control in the same manner as the tabs 29, and when the shaft 16 is assembled with the bearing bushing 25' the latching hooks 38 of the shaft have latching engagement with the clinched portions of tabs 41 as before.

While the control shaft is preferably constituted of flat stock, in the manner hereinabove described, the invention also contemplates the provision of shaft structure of the character shown in Figure 10, where the main portion of the shaft, designated at 50, is round, and one end thereof is flattened, as indicated at 51. In this construction the flattened end is slotted, as at 52, and is formed with the latching hooks 53, so that the shaft is assembled with the bearing bushing in the same way in which the shaft 16 is assembled.

In some constructions, and especially where the sections of the reduced inner end of the shaft on the opposite sides of its slot are spread apart so that in the assembly they are under considerable tension, it may be desirable to have the latching projections at the inner end of the shaft of the special construction shown in Figure 10a. As there shown, the latching projections are designated generally at 55, and have pronounced and somewhat elongated camming surfaces 56 sloping transversely of the shaft and effective to insure snapping of the latching shoulder 57 of the latching projections 55 into latching engagement with the parts with which they are engageable. In this construction the slot of the shaft, designated at 58, may be flared as shown.

Figure 14 illustrates a slight variation in the construction of the rotatable bearing bushing or cartridge. The rotatable bushing or cartridge shown in Figure 14 is designated at 77', and is identical with the cartridges 77 and 25, save that the slot in its outer end wall has its side edges serrated or roughened, as indicated at 82' to enhance the frictional engagement between the cartridge and the portion of the shaft fitted in the slot.

In Figures 11 to 13, inclusive, the invention is shown embodied in a multiple or twin control unit. The multiple or twin control unit may comprise a plurality of volume control devices, designated at 60 and 61, which, except for certain details in the construction of their housings, and of the manner of their support, are identical, and are in fact internally constructed in the same manner as the volume control device 10, illustrated in Figures 1 to 3, in that each has a movable contact 14 adjustable around a resistance element 13, each movable contact 14 being carried by an insulating disk 15. The insulating disks 15 of the movable contacts 14 are rotatively coupled to the manually adjustable shaft 62 in a manner which will be hereinafter more fully described.

The volume control device 60 has a cup-shaped housing 63 of insulating material. The end wall 64 of this housing is centrally apertured and suitably recessed to adapt it to be interengaged with a suitable type of fixed bearing which may take the form of an externally threaded fixed sleeve 65. The inner end of the sleeve 65 is flanged, as at 66, to interfit with the margin of the central opening of the end wall 64 of the housing, and the threaded portion of the sleeve projects beyond the end wall of the housing. A centrally apertured metal plate 67 is fitted over the projecting portion of the bushing and abuts the outer face of the end wall of the housing. This plate 67, bushing 65, and housing 63 are maintained assembled by means of a thin nut 68 threaded on the bushing and coacting with the flange 66 to clamp the parts together. In use, the bearing sleeve 65 projects through an opening provided therefor in the supporting member 69, which may be a part of the chassis of a radio receiver, and is releasably held in position thereon by means of a mounting nut 70 fitted on the bushing and engageable with the support on the opposite side thereof from the nut 68.

The control device 61 also has an insulating housing designated at 71, which is generally of cup shape, and has an end wall 72 which is disposed adjacent the open end of the housing 63. The end wall 72 of the housing 71 may have integrally moulded therewith a bearing sleeve 73, which is axially alined with the fixed bearing sleeve 65. A metal cover 74 closes the open end of the housing 71, and has extension or cover legs 75 of arcuate form in cross section, and which extend along diametrically opposite portions of the exterior of the housings of the two units. The outside peripheral surface of the housing of the two units may be provided with parallel ribs 75' between which cover legs or extensions 75 are disposed. At their outer ends the cover legs or extensions 75 have securing lugs or tabs 76 integral therewith and bent around in fastening engagement to the edge portions of the plate 67 to releasably secure the parts assembled. If desired, the leg 75 may also have integral lugs 76', designed to interfit with openings in the supporting member 69 to locate the assembly and hold it against turning.

A cartridge or rotatable bearing bushing 77, very similar in construction to cartridge or bearing sleeve 25, is fitted in the fixed bearing sleeve 65 for rotative movement. The rotatable bearing bushing or cartridge 77, like the cartridge 25, has a cylindrical body portion, designated at 78, provided at one end with an integral end wall 79 united to the body portion of the cartridge by means of a crimp or flange 80. The cylindrical body portion 78 of the cartridge 77 is provided at its inner end, and at diametrically opposite portions, with integral, bendable anchoring lugs 81. A diametrical slot 82 is formed in the end wall 79 of the bearing bushing 77.

A similar, though shorter, cartridge or rotatable bearing bushing, designated at 83, is fitted in the fixed bearing sleeve 73 of the housing 71 of the control unit 61. It also has its cylindrical body portion rotatively fitted in the bearing sleeve and integral outer end wall united to its body portion by a crimp or flange, a diametrical slot in the outer end wall, and anchoring tabs 84 integral with the inner end of the cylindrical end wall. In the assembly the anchoring tabs 81 and 84 of the bearing sleeves 77 and 83 are extended through the diametrical slots 15' of the insulating disks 15 of the control units, and are bent or clinched over into secure engagement with these disks, or with metal parts carried thereby.

In this construction the reduced and slotted end of the shaft 62 is elongated in order to control both units 60 and 61, and it is extended through the diametrical slots of both cartridges 77 and 83 and has latching projections 85 at its inner end which have latching engagement with the anchoring tabs 84 of the inner cartridge. Moreover, the shoulders 86 at the juncture of the main and reduced portions of the shaft 62 engage the flange 80 of the outer cartridge or bearing sleeve 77. The outer edges of the slotted portion of the shaft are engaged with the inner peripheral surfaces of both cartridges or bearing sleeves 77 and 83. A construction of this character simplifies the mounting and assembly of a multiple or twin unit, and by reducing the number of parts which must be provided, correspondingly reduces the cost and yet provides a highly satisfactory and efficient control device.

In Figures 15 to 17 of the drawings, the invention is shown embodied in a step-by-step or all-wave switch. The switch comprises a stator designated at 90, and is constituted of a generally annularly shaped flat strip of material, such as Bakelite, which has apertured enlargements 91 at diametrically opposite points thereof. A generally U-shaped metal mounting frame 92 is provided to support the stator in position and has the ends of its legs reduced and split so as they may be extended through the apertures of the enlargements 91 and offset and clinched over in securing relation to the stator, as indicated at 92'. The stator 90 surrounds a disk-like rotor 93 of similar material, and is centrally slotted as at 94 so as to be adapted to be rotatably coupled to the control or operating shaft 95, in a manner which will hereinafter more clearly appear. The stator 90 carries an appropriate number of stator clips 96, and the rotor has suitable cooperable contact members 97, which act not only to provide for the desired switching action, but also maintain the rotor in the same plane as the stator although free to rotate relative thereto.

The switch will not be further described as the details of its construction per se form no part of the present invention, and as it is fully disclosed and claimed in the application of John S. Coldwell for "Switches," filed September 20, 1939, Serial No. 295,707, and owned by the assignee of this application.

The frame or mounting plate 92 of the switch is supported on a fixed sleeve or bearing bushing 98, which is in turn mounted on the chassis of the radio receiver or other supporting member, designated at 99. The bushing or sleeve 98 is provided with an integral outwardly directed annular shoulder or collar 100, one face of which, in the assembly, abuts the margin of the opening in the supporting member 99. A nut 101, threaded on the bushing 98, coacts with the shoulder 100 to clamp the assembly in position on the supporting member 99. To positively secure the switch assembly against rotation relative to its supporting member, a plate 102 may be interposed between the body portion of the switch frame 92 and the collar 100, and be securely held against movement with respect to these parts by virtue of the fact that portions of the inner end of the bushing are upset or staked against a fixed detent plate 116, which in turn is rigidly pressed against the frame 92, as indicated at 103. This firmly clamps the switch frame 92, plate 102, detent plate 116, and bushing 98 together. The plate 102 is provided with a locating lug 104, which extends at right angles thereto and projects through a locating hole provided therefor in the supporting member 99.

The present invention proposes to rotatably fit a cartridge or bearing bushing 106 in the fixed bearing sleeve 98, and the cartridge or rotatable bearing bushing 106 is similar in construction to the cartridge or bearing bushing 25, 77, and 83, in that it has its cylindrical body portion rotatably fitted in the fixed bearing sleeve 98, has an integral end wall at its outer end united to the cylindrical body by a crimp or flange, and has its outer end wall provided with a diametrical slot. The inner end of the body of the cartridge or rotatable bearing bushing 106 has anchoring tabs 107 integral therewith and crimped or staked into engagement with the rotatable index spring 108 of an index mechanism, designated generally at 110. The tabs 107 thus secure the inner end of the rotatable bearing bushing or cartridge 106 to the rotatable index spring 108 but leaves these two elements 106 and 108 free to rotate together relative to the fixed bearing sleeve 98. By so securing the lugs 107 to the index spring 108 the rotatable bearing sleeve or cartridge 106 is prevented from outward axial displacement. The flange at its outer end prevents inward axial displacement thereof.

The index spring 108 comprises a generally circular piece of spring steel or other suitable resilient metal, slotted circumferentially inwardly of its periphery, to provide a hub portion 111 and an arcuate strip-like peripheral portion 112 united to the hub portion by means of a radially extending connecting portion 113. The hub portion 111 of the detent plate is provided with a diametrical slot, and the tabs 107 are extended through this diametrical slot before being clinched or staked against the detent plate. The arcuate strip-like portion 112 has integrally formed therewith a generally V-shaped or wedge-shaped detent 114, which is displaced from the plane of the hub portion and is set in such displaced position. This detent 114, by virtue of its wedge-like formation, is fashioned to coact with suitably spaced, fixed detent lugs 115 formed on and projecting outwardly therefrom on the fixed detent plate 116 confined between the stakes 103 and the body of the frame 92. The rotatable detent spring 108 also has a stop lug 117 integral therewith and designed to engage fixed stop lugs provided at appropriate points on the fixed detent plate.

With this construction the control shaft 95 has a reduced and slotted inner end as before, and is designed to be extended through the slot in the outer end wall of the bearing end sleeve or cartridge, and further to project inwardly beyond the inner end of the sleeve or cartridge so that its inner extremities 120 will project and fit in the slot 94 of the rotor of the switch, thereby rotatably coupling the control shaft to the control switch. In this form of the invention the latching projections, designated at 121, are formed on the sections of the reduced portion of the shaft which lie on the opposite sides of its slot at points spaced from the inner end so as to be engageable with the locking tabs 107, whereby to releasably secure the shaft 95 against outward axial displacement. The shoulders 122, presented at the juncture of the reduced and main portion of the shaft 95, limit the inward axial movement of the shaft 95.

With this construction the shaft 95 is rotatably coupled to the bearing sleeve or cartridge 106 and to the rotor of the switch, and incidentally also to the rotatable element of the detent mechanism, and it is releasably and securely held against axial displacement.

While I have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claims.

I claim:

1. The combination with an instrumentality having a fixed bearing sleeve, of a cartridge-type bearing bushing having its body portion rotatively fitted in said sleeve and having a closed and flanged end disposed at the outer end of the sleeve with the flange rotatively abutting the outer end of the sleeve, the closed end of the bushing having a transverse slot, means coacting with the inner end of the bushing to prevent outward axial displacement thereof, and a control shaft having its inner end reduced and of flat stock, said inner end of the shaft being inserted in the bushing through said transverse slot and having a latching projection for releasably securing said shaft against axial displacement.

2. The combination with an instrumentality having a fixed bearing sleeve, of a cartridge-type bearing bushing having its body portion rotatively fitted in said sleeve and having a closed and flanged end disposed at the outer end of the sleeve with the flange rotatively abutting the outer end of the sleeve, the closed end of the bushing having a transverse slot, means coacting with the inner end of the bushing to prevent outward axial displacement thereof, and a control shaft having its inner end reduced and of flat stock, said inner end of the shaft being inserted in the bushing through said transverse slot, the inner end of the shaft being slotted to provide spring arms, said spring arms having beveled latching projections for releasably securing the shaft against axial displacement.

3. The combination with an instrumentality having a fixed bearing sleeve, of a cartridge-type bearing bushing having its body portion rotatively fitted in said sleeve and having a closed and flanged end disposed at the outer end of the sleeve with the flange rotatively abutting the outer end of the sleeve, the closed end of the bushing having a transverse slot, the inner end of the body portion of the bushing having integral securing tabs, means against which said tabs are clinched to prevent outward axial displacement of the bushing, and a control shaft having its inner end reduced and of flat stock, said inner end of the shaft being inserted in the bushing through said transverse slot and having a latching projection for releasably securing said shaft against axial displacement.

4. The combination with an instrumentality having a fixed bearing sleeve, of a bearing bushing rotatively fitted in said sleeve, and a control shaft rotatively coupled to said bushing and having a latching projection biased to latching position for releasably securing the shaft against axial displacement relative to the bushing, the shaft having a portion extending inwardly beyond said projection and adapted to be rotatively coupled to an element to be controlled.

5. The combination with the housing of an instrumentality having a rotatable element therein and a fixed bearing sleeve at one end thereof, of a bearing bushing rotatably fitted in said sleeve and having a flange at the outer end thereof engageable with the outer end of said sleeve, said rotatable element having its outer peripheral portion cooperable with an end wall of the housing and having the central portion abutting the inner end of the sleeve, said central portion having a non-circular opening therein alined with the opening in the sleeve, said bearing bushing having anchoring lugs integral with its inner end, extended through said opening and clinched around the inner face of said element, and a control shaft having its inner end reduced and inserted in and rotatively coupled to said bushing and formed with a longitudinal slot extending out through the inner end of the shaft to provide a pair of spring fingers, said fingers having beveled latching projections at their inner ends adapted to have latching engagement with the clinched portions of said lugs, the juncture of the reduced and main portions of the shaft presenting shoulders, said flange of said bushing having slots with which said shoulders are interfitted.

6. The combination with the housing of a control instrumentality having a rotatable control element therein and a fixed bearing sleeve at one end thereof, of a bearing bushing rotatably fitted in said sleeve and having a flange at the outer end thereof engageable with the outer end of said sleeve, said rotatable control element having a non-circular opening alined with the opening of the sleeve, the inner end of the sleeve having anchoring lugs extended through said non-circular opening and clinched into engagement with said control element, and a control shaft rotatively coupled to and releasably interconnected with said bushing.

7. The combination with the housing of an instrumentality having a rotatable element therein and a fixed bearing sleeve at one end thereof, of a bearing bushing rotatably fitted in said sleeve and having a flange at the outer end thereof engageable with the outer end of the sleeve, said bearing bushing also having an end wall formed with a diametrical slot, said rotatable element abutting the inner end of the sleeve and having a non-circular opening alined with the opening in the sleeve, the inner end of the sleeve having anchoring lugs integral therewith and clinched into engagement with the margins of said non-circular opening, and a flat shaft inserted in the bushing and fitted in the slot in the end wall thereof and having spring fingers at its inner end formed with beveled latching projections engageable with the clinched portions of said lugs to releasably secure the shaft against axial displacement relative to the bushing.

8. A control device of the character described comprising a casing having a fixed bushing, a hollow cylindrical bearing bushing rotatably supported in said fixed bushing, said bearing bushing being provided with an end wall, a diametrical slot formed in said wall, and a control shaft having its inner end of flat stock extending within said bearing bushing, portions of the edges of said shaft being engaged with the inner peripheral wall of said bearing bushing, the sides of the flat portion of said shaft being engaged with said slot, said shaft having a latching projection for releasably securing said shaft against axial displacement within said bearing bushing.

9. A control device of the character described comprising a casing having a fixed bushing, a hollow cylindrical bearing bushing rotatably supported in said fixed bushing, said bearing bushing having an upwardly directed annular flange having rotative engagement with the end of said fixed bushing, and an operating shaft having a portion of flat stock extending within said bearing bushing and having its edges in engagement with the inner peripheral wall thereof, said shaft having a latching projection for releasably securing said shaft against axial displacement within said bearing bushing, there being interlocking means between said flange and said shaft to prevent relative movement therebetween.

HARRY W. RUBINSTEIN.